US011019500B2

(12) United States Patent
Zhu et al.

(10) Patent No.: US 11,019,500 B2
(45) Date of Patent: May 25, 2021

(54) APPARATUS FOR DETERMINING AN ESTIMATED NUMBER OF BYTES TO SEND OVER A LINK

(71) Applicant: APPLE INC., Cupertino, CA (US)

(72) Inventors: Jing Zhu, Portland, OR (US); Jerome Parron, Fuerth (DE); Nageen Himayat, Fremont, CA (US); Penny Efraim-Sagi, Kfar Sava (IL); Martin Kolde, Neubiberg (DE)

(73) Assignee: APPLE INC., Cupertino, CA (US)

( * ) Notice: Subject to any disclaimer, the term of this patent is extended or adjusted under 35 U.S.C. 154(b) by 783 days.

(21) Appl. No.: 14/851,771

(22) Filed: Sep. 11, 2015

(65) Prior Publication Data

US 2017/0078890 A1 Mar. 16, 2017

(51) Int. Cl.
| | |
|---|---|
| *H04W 16/14* | (2009.01) |
| *H04W 8/08* | (2009.01) |
| *H04W 28/08* | (2009.01) |
| *H04W 84/12* | (2009.01) |
| *H04W 84/04* | (2009.01) |
| *H04W 88/06* | (2009.01) |
| *H04W 88/10* | (2009.01) |

(52) U.S. Cl.
CPC .............. *H04W 16/14* (2013.01); *H04W 8/08* (2013.01); *H04W 28/08* (2013.01); *H04W 84/04* (2013.01); *H04W 84/12* (2013.01); *H04W 88/06* (2013.01); *H04W 88/10* (2013.01)

(58) Field of Classification Search
CPC ..... H04W 16/14; H04W 28/08; H04W 84/04; H04W 84/12; H04W 88/06; H04W 88/10; H04W 8/08
See application file for complete search history.

(56) References Cited

U.S. PATENT DOCUMENTS

| | | | |
|---|---|---|---|
| 9,161,322 B2 * | 10/2015 | Dinan | H04W 56/0005 |
| 2005/0232154 A1 * | 10/2005 | Bang | H04L 47/10 |
| | | | 370/235 |
| 2011/0154146 A1 * | 6/2011 | Shin | H04L 1/1832 |
| | | | 714/749 |

(Continued)

FOREIGN PATENT DOCUMENTS

| | | | |
|---|---|---|---|
| WO | 2015018535 A1 | 2/2015 | |
| WO | WO 2015018535 A1 * | 2/2015 | ............ H04W 36/02 |

OTHER PUBLICATIONS

PCT/US2016/046165, International Search Report and Written Opinion, dated Nov. 9, 2016, 13 pages.

*Primary Examiner* — Omar J Ghowrwal
*Assistant Examiner* — Kokou R Detse
(74) *Attorney, Agent, or Firm* — Stoel Rives LLP

(57) ABSTRACT

Systems and methods provide cross-layer bearer splitting and cross-RAT retransmission in a RAN-based WLAN/WWAN integrated network. A link aggregation transmitter is configured to receive, from a WLAN stack lower layer protocol, a WLAN transmission confirmation signal and a WLAN congestion status, and to receive, from a WWAN stack lower layer protocol, a WWAN transmission confirmation signal and a WWAN congestion status. The link aggregation transmitter dynamically splits the bearer traffic across the WWAN link and the WLAN link based at least in part on the WLAN transmission confirmation signal, the WLAN congestion status, and the WWAN congestion status.

17 Claims, 6 Drawing Sheets

(56) References Cited

U.S. PATENT DOCUMENTS

| | | |
|---|---|---|
| 2014/0213277 A1 | 7/2014 | Jang |
| 2014/0293970 A1* | 10/2014 | Damnjanovic ....... H04L 5/0078 |
| | | 370/336 |
| 2016/0034405 A1* | 2/2016 | Kwon ................. G06F 13/4282 |
| | | 710/308 |
| 2016/0302197 A1* | 10/2016 | Xie ..................... H04L 12/6418 |
| 2016/0353324 A1* | 12/2016 | Lee ....................... H04W 28/08 |
| 2017/0026824 A1* | 1/2017 | Kim ........................ H04W 8/08 |

* cited by examiner

APPARATUS FOR DETERMINING AN ESTIMATED NUMBER OF BYTES TO SEND OVER A LINK

TECHNICAL FIELD

The present disclosure generally relates to heterogeneous wireless communication systems.

BACKGROUND INFORMATION

Wireless mobile communication technology uses various standards and protocols to transmit data between a base station and a wireless communication device. Wireless wide area network (WWAN) communication system standards and protocols can include, for example, the 3rd Generation Partnership Project (3GPP) long term evolution (LTE), and the Institute of Electrical and Electronics Engineers (IEEE) 802.16 standard, which is commonly known to industry groups as worldwide interoperability for microwave access (WiMAX). Wireless local area network (WLAN) can include, for example, the IEEE 802.11 standard, which is commonly known to industry groups as Wi-Fi. Other WWAN and WLAN standards and protocols are also known.

In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). In LTE networks, an E-UTRAN may include a plurality of eNBs and may communicate with a plurality of UEs. An evolved packet core (EPC) may communicatively couple the E-UTRAN to an external network, such as the Internet. LTE networks include radio access technologies (RATs) and core radio network architecture that can provide high data rate, low latency, packet optimization, and improved system capacity and coverage.

DETAILED DESCRIPTION OF PREFERRED EMBODIMENTS

Figure 1:
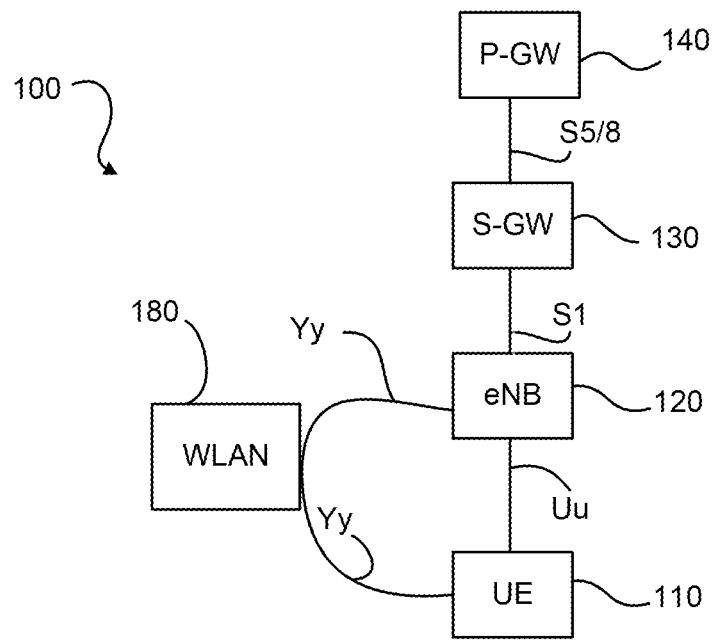
FIG. 1 is a block diagram illustrating a RAN-based WLAN/WWAN integrated network architecture that may be used with certain embodiments.

Certain embodiments disclosed herein provide cross-layer bearer splitting and cross-RAT retransmission in a RAN-based WLAN/WWAN integrated network. A WLAN is a wireless computer network that includes a WLAN access point (AP) linking two or more devices using a wireless distribution method, often spread-spectrum or orthogonal frequency-division multiplexing (OFDM) radio, within a relatively small area such as a home, school, computer laboratory, or office building. This wireless distribution method provides users the ability to move around within a local coverage area while maintaining network connectivity, and thereby facilitates a connection to the wider Internet. A WWAN may cover a larger geographical area than that covered by a WLAN and generally requires differences in technology. A WWAN may be provided by a wireless service provider and may provide, for example, regional, nationwide, or even global coverage.

An eNB may be able to send data over multiple radio links using different RATs. For example, the radio links may include a WLAN link, an LTE link (or other WWAN link), a millimeter wave link, and/or the like. The E-UTRAN may be used as a control and mobility anchor for the WLAN link, which may serve as an additional "carrier" within the LTE network for data offloading. Bearer traffic received by the E-UTRAN may be tunneled over the WLAN via a point-to-point (p2p) link between the eNB and the UE. The p2p link may be routed through the WLAN and may be set up with the help of a proprietary or standardized interface between the eNB and WLAN AP. The bearer may be split over both the WLAN and LTE links, or in some embodiments, the entire bearer may be offloaded to the WLAN.

The bearer may be split and/or aggregated at any of various different layers of the protocol stack. For example, a data radio bearer may be split over the WLAN and LTE links above a packet data convergence protocol (PDCP) layer, inside the PDCP layer, below the PDCP layer, or the like. A WLAN adaptation transmit/receive (TX/RX) layer may handle all additional protocols required for the protocol data units (PDUs) delivered over the WLAN link. The additional protocols may include encryption, header compression, encapsulation, tunneling, etc. For example, a link aggregation transmit layer may be above a sequence numbering layer, above a header compression layer, above an integrity protection layer and/or a ciphering layer, above a layer for adding a PDCP header, below the layer for adding the PDCP header, etc. Similarly, a link aggregation receive layer may be below a layer for removing the PDCP header, above the layer for removing the PDCP header, above an integrity verification layer and/or a deciphering layer, above a header decompression layer, above a layer for ensuring in-order delivery and for detecting duplicates, and/or the like.

For splitting at any layer, a proportion of traffic to be sent on each link may need to be determined (e.g., bearer split control); a granularity and/or frequency of bearer data transfer to each link may be determined (e.g., data transfer/flow control); and rules and timing for retransmitting failed transmissions on another link may be determined (e.g., cross-RAT retransmission). The bearer split control, data transfer/flow control, and/or cross-RAT retransmission may be determined dynamically and/or statically. For example, dynamic bearer split decisions based on real-time measurements may maximize utilization of each link. Dynamic bearer splitting based on real-time measurements may improve or maximize the utilization of both a WLAN link and a WWAN link (e.g., LTE link). The bearer split decisions may account for link quality and traffic quality of service (QoS) requirements across users.

Various embodiments may perform real-time decision-making for traffic routing/splitting and cross-RAT retransmission. In some embodiments, a transmitter may make dynamic bearer splitting decisions and perform cross-RAT retransmission with limited or no coordination with a receiver, which may reduce signaling overhead. The transmitter may perform splitting and cross-RAT retransmission at any protocol layer, may be an uplink or a downlink transmitter, and may include collocated radio interfaces for each link or non-collocated radio interfaces. The UE and eNB may be responsible for managing cross-RAT transmission policies of the uplink and downlink bearers respectively. However, in some embodiments, the UE bearer splitting decisions may include network assistance to the UE to reduce or preclude greedy decisions by individual UEs.

In certain embodiments, a link aggregation transmitter determines how bearer traffic will be assigned dynamically across each link. The link aggregation transmitter may be configured to operate under a push architecture wherein the link aggregation transmitter may explicitly determine and control how traffic is split across multiple links and/or across multiple users, rather than in a pull architecture that implicitly determines splitting by relying on lower layer link schedulers to drive the splitting operation. In the push architecture, the link aggregation transmitter may receive link and/or interface statistics, which may be reported by lower layer modules. The link aggregation transmitter may explicitly and dynamically compute a splitting policy between the links based on the link/interface statistics and/or may make assignments according to policies specified by a radio resource control (RRC) layer. In some embodiments, the link aggregation transmitter may account for statistics across all users before making decisions for each user and/or each bearer. Various optimization criteria may be used to make the decision. In other embodiments, simple decisions may be made based on statistics for individual bearers.

After determining the splitting policy, the link aggregation transmitter may divide received traffic based on the splitting policy. After division, the link aggregation transmitter may send the traffic to local buffers within the lower layers of the stack for each radio interface. Each radio interface may perform independent processing and scheduling across each link. In some embodiments, lower layer schedulers may exchange additional information to facilitate loosely coordinated assignments of radio resources according to system optimization metrics (e.g., proportional fair metric, delay sensitive metrics, queue length, etc.). In some embodiments, once the traffic is split, the transmission and scheduling policies of individual RATs may be used to send data through the protocol stack and onto the air interface.

The lower layers may be responsible for indicating the available transmission opportunities to the link aggregation transmitter. In some embodiments, the lower layers may also make additional link quality statistics, such as packet error rate, congestion notification, etc., available to the link aggregation transmitter. The provision of such link quality statistics may be natively available at the radio link control (RLC) layer for an LTE link, but a WLAN link may need to be modified (e.g., through the addition of a WLAN control) to support the provision of similar information for the WLAN link.

In certain embodiments, an X2-W interface may be used to send WLAN link quality metrics to a link aggregation transmitter at an eNB for use in determining a bearer split ratio. The link quality metrics may include link throughput delay for individual UEs, delay, quality of experience (QoE), contention level (e.g., back-off status), buffer status, congestion indication or queue length, load level, average access delay, and/or the like. Additional signaling may also be used to communicate packet transmission confirmation status in embodiments with cross-RAT retransmission. The X2-W interface may be used to send an indication of bearer split activation, expected data transmission rate, and/or the like from the link aggregation transmitter at an eNB to a WLAN AP for each bearer. The link aggregation transmitter may transmit requests for the WLAN to report packet transmission confirmation, link quality reports, buffer status reports, and/or the like.

In some embodiments, an enhanced and/or network-assisted architecture may be used for the UE to perform UL bearer splitting. In some embodiments, before sending any traffic over the LTE link, the UE may first send out a buffer status report (BSR) to the eNB. The BSR may indicate the uplink needs of the UE. For example, for a UE using only an LTE link, the BSR may be determined based on all packets waiting for transmission in the PDCP and RLC buffers. For a UE performing UL bearer splitting, some of the packets may be sent over another link, so it may be difficult for the UE to determine in advance the number of bytes that will be sent over the LTE link. Accordingly, the UE may receive eNB assistance to a UE-controlled bearer splitting algorithm. For example, the UE may transmit a BSR for the link aggregation function, and the BSR may indicate overall buffers status and request separate allocations for each link (e.g., a WLAN link and an LTE link). In certain embodiments, the UE estimates a number of bytes that will be sent of a WWAN link (e.g., LTE link) based on a total number of bytes of un-transmitted packets in a transmission queue, total number of bytes of the transmitted packets in the transmission queue awaiting confirmation of successful delivery, total number of bytes of the packets in a retransmission queue, an estimated traffic splitting ratio parameter for the WWAN link provided by the eNB, and an estimated retransmission rate for the WLAN link provided by the eNB.

The UE link aggregation transmitter may coordinate with an eNB link aggregation transmitter to submit the BSR and receive appropriate resource grants, which may be jointly across multiple radio links. The eNB may determine the UL split based on various link quality, loading, and/or congestion parameters observed across all users associated with the eNB. The eNB may also determine a joint allocation across resources of multiple radio links. The format of resource allocation notifications may vary for different radio links. In an embodiment, the eNB may assign a probability of transmission for a WLAN link, which may be used by the UE to back off from contending on the WLAN link. For example, the eNB may schedule the UE for transmission on the WLAN link by assigning a transmission probability of 1 to the UE, which may indicate that if only commonly controlled UEs are using the WLAN access, the UE will effectively be able to schedule its transmission without contention. Alternatively, or in addition, the UE may be assigned a time slot for transmission, which may be loosely synchronized with LTE transmissions. Alternate methods for assigning transmission opportunities will be apparent to those of skill in the art.

Various methods may be used by the eNB to notify the UE of a joint allocation to the UE. In an embodiment, the eNB may only notify the UE of an uplink grant on the LTE link. The UE may utilize the allocated bandwidth on the LTE link and transmit the remainder of the requested allocation over an alternate link. Alternatively, or in addition, the eNB may explicitly notify the UE of its uplink LTE allocation as well as, for example, a WLAN probability of transmission.

FIG. 1 is a block diagram illustrating a RAN-based WLAN/WWAN integrated network architecture 100 that may be used with certain embodiments. The network architecture 100 provides an end-to-end network for cellular communications, including a UE 110, an eNB 120, and the following two gateway entities of an evolved packet core (EPC): a serving gateway (S-GW) 130 and a packet data network (PDN) gateway (PDN GW, or P-GW) 140. Skilled persons will recognize that an EPC typically includes other network entities and interfaces that, for conciseness, are not shown in FIG. 1.

Figure 6:
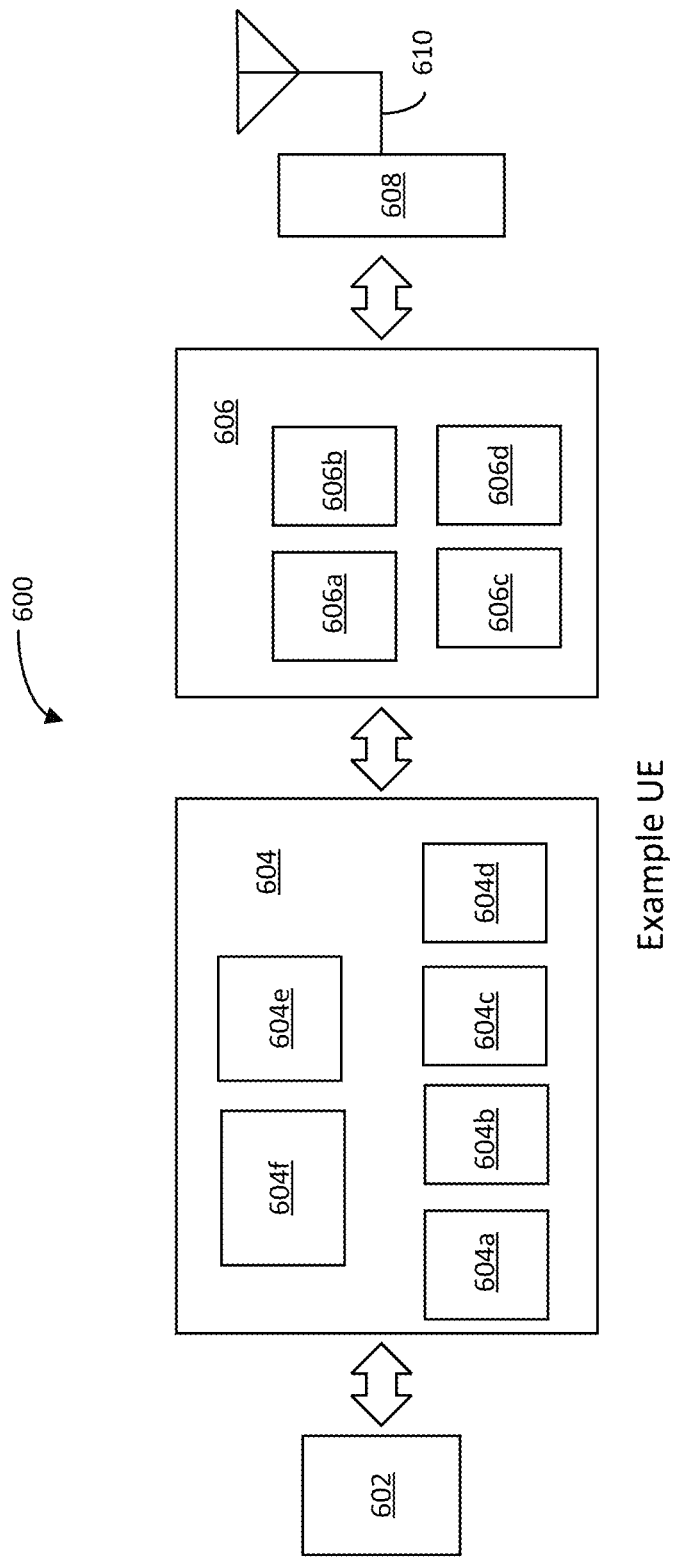
FIG. 6 illustrates, for one embodiment, example components of a UE device.

The UE 110, an example of which is described in further detail in subsequent paragraphs with reference to FIG. 6, communicates with the eNB 120 through an air interface Uu (also referred to as a cellular link, a WWAN link, an LTE link, or a 3GPP link), which may comprise a wireless radio communication channel defined in 3GPP standards for LTE wireless networks.

The S-GW 130, in communication with the eNB 120 through an S1 interface, provides a point of interconnect between the wireless radio side and the EPC side of the network architecture 100. The S-GW 130 is the anchor point for the intra-LTE mobility, i.e., in case of a handover between eNBs and between LTE and other 3GPP accesses. The S-GW 130 is logically connected to the other gateway, the P-GW 140, through an S5/8 interface. 3GPP standards specify separately the S-GW 130 and the P-GW 140, but in practice, these gateways may be combined as a common network component provided by a network equipment vendor.

The P-GW 140 provides a point of interconnect between the EPC and an external internet protocol (IP) network (not shown). An external IP network is also called a PDN. The P-GW 140 routes IP packets to and from PDNs.

In addition to the aforementioned end-to-end cellular network components, FIG. 1 also shows that the UE 110 communicates with the eNB 120 through a WLAN 180 via a Yy interface. The Yy interface represents the operative network connection and protocols between the UE 110 and its associated cellular base station, the eNB 120. In other words, the Yy interface is a logical interface that may be realized by a WLAN point-to-point communication link between the UE 110 and the eNB 120 for routing the UE 110's cellular traffic via the WLAN 180. Thus, the terms "Yy interface" and "WLAN point-to-point communication link" or "WLAN link" may be used interchangeably.

Figure 2:
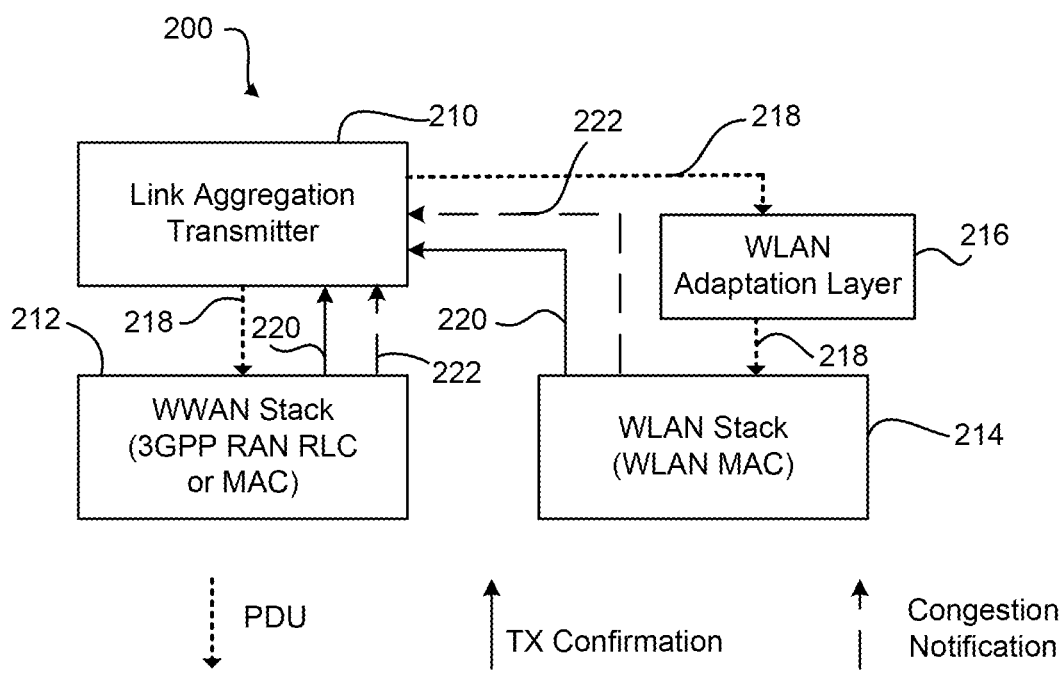
FIG. 2 is a block diagram illustrating a cross-layer bearer splitting system for use in wireless transmissions according to one embodiment.

FIG. 2 is a block diagram illustrating a cross-layer bearer splitting system 200 for use in wireless transmissions according to one embodiment. The system 200 is applicable to both uplink and downlink embodiments, regardless of whether or not the WWAN and WLAN are collocated. Thus, for example, the UE 110 shown in FIG. 1 may use the system 200 for uplink bearer splitting and cross-RAT retransmission, the eNB 120 shown in FIG. 1 may use the system for downlink bearer splitting and cross-RAT retransmission, or both the UE 110 and the eNB 120 may use the system 200.

The system 200 includes a link aggregation transmitter 210, a WWAN stack 212, a WLAN stack 214, and a WLAN adaptation layer 216. As discussed in detail herein, the link aggregation transmitter 210 performs bearer splitting and cross-RAT retransmission. Thus, the link aggregation transmitter 210 decides whether to send a packet, or more specifically a PDU 218 corresponding to a layer in the WWAN stack 212 where bearer splitting occurs, to either the WWAN stack 212 or the WLAN stack 214 (through the WLAN adaptation layer 216). The WLAN adaptation layer 216 encapsulates the PDU 218 from the link aggregation transmitter 210 to allow transmission over the WLAN link.

The WWAN stack 212 and the WLAN stack 214 may be logical modules for transmitting packets over a WWAN link and a WLAN link, respectively. FIG. 2 illustrates signaling between the link aggregation transmitter 210 and lower layer protocols of the WWAN stack 212 and the WLAN stack 214. Persons skilled in the art will recognize, however, that the link aggregation transmitter 210 may also interface with upper layer protocols. In the example shown in FIG. 2, the WLAN stack lower layer protocol is the WLAN media access control (MAC) layer. The link aggregation transmitter 210 may operate at different layers of the WWAN stack 212. In the illustrated 3GPP RAN example, the link aggregation transmitter 210 may operate above or below the RLC layer. Thus, the WWAN stack lower layer protocol may be the RLC layer or the MAC layer. It should be noted that, according to certain embodiments, the link aggregation transmitter 210 operates on a per-UE and per-bearer basis.

The lower layer protocols of the WWAN stack 212 and the WLAN stack 214 send cross-layer signals to the link aggregation transmitter 210 to assist with bearer splitting and retransmission decisions. The cross-layer signals shown in FIG. 2 include a transmission (TX) confirmation 220 and a congestion notification 222. The transmission confirmation 220 indicates a result (e.g., success or failure) of each transmission, along with an identification (e.g., sequence number) of the transmission. The congestion notification 222 indicates a link status (e.g., congested status or non-congested status), and optionally an amount of resource available for allocation (e.g., for the 3GPP link).

Figure 3:
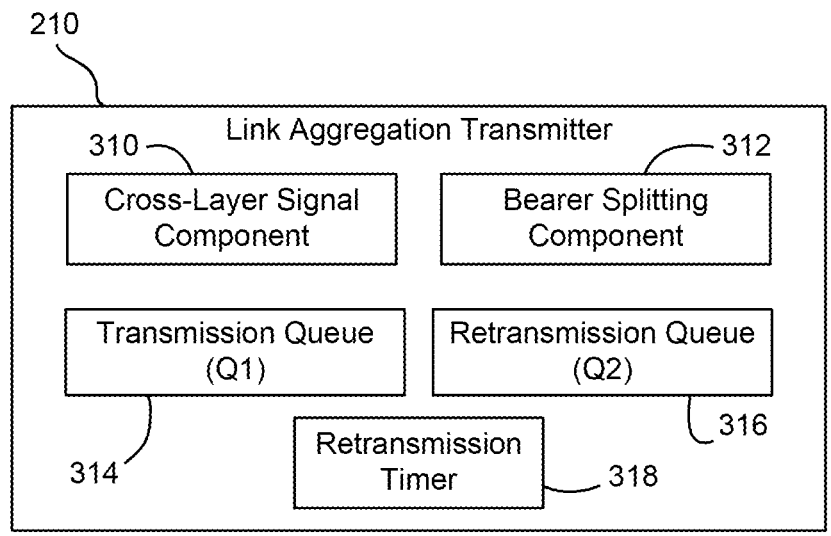
FIG. 3 is a block diagram illustrating an example link aggregation transmitter according to one embodiment.

FIG. 3 is a block diagram illustrating an example link aggregation transmitter 210 according to one embodiment. In this example, the link aggregation transmitter 210 includes a cross-layer signal component 310, a bearer splitting component 312, a transmission queue 314, a retransmission queue 316, and a retransmission timer 318. Persons skilled in the art will recognize from the disclosure herein that the illustrated elements or components are provided for discussion purposes and that any of the elements or components may be combined. For example, in one embodiment the transmission queue 314 and the retransmission queue 316 share a single buffer, whereas in another embodiment separate buffers are used for the transmission queue 314 and the retransmission queue 316.

The cross-layer signal component 310 is configured to receive, from the WLAN stack lower layer protocol, the transmission confirmation 220 for packets transmitted over the WLAN link and the congestion notification 222 indicating the WLAN congestion status. The cross-layer signal component 310 is also configured to receive, from the WWAN stack lower layer protocol, the transmission confirmation 220 for packets transmitted over the WWAN link and the congestion notification 222 indicating the WWAN congestion status. As discussed in detail herein, the bearer splitting component 312 is configured to dynamically split the bearer traffic across the WWAN link and the WLAN link based at least in part on the WLAN transmission confirmation, the WLAN congestion status, the WWAN transmission confirmation, and the WWAN congestion status. The link aggregation transmitter 210 is also configured to provide cross-RAT retransmission of failed packets.

Figure 4:
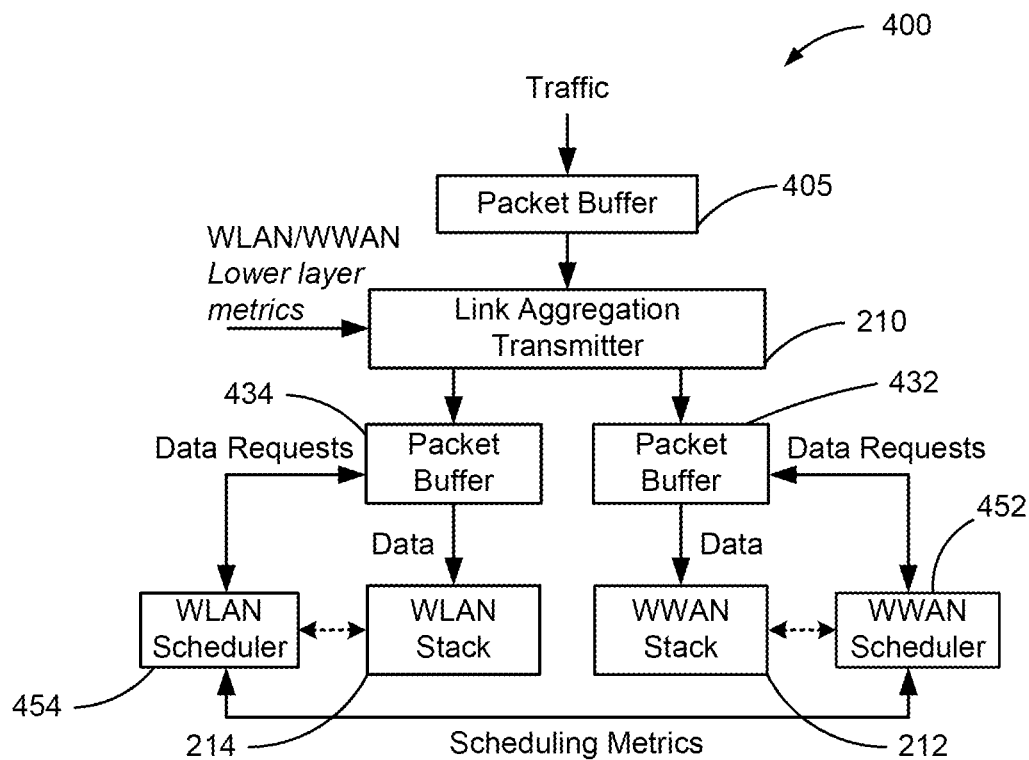
FIG. 4 is a schematic diagram of a push architecture for splitting bearer traffic between a WWAN stack and a WLAN stack according to one embodiment.

To provide context, the link aggregation transmitter 210, WWAN stack 212, and WLAN stack 214 are shown in FIG. 4 with other transmitter components. FIG. 4 is a schematic diagram of a push architecture 400 for splitting bearer traffic between a WWAN (e.g., LTE) stack 212 and a WLAN stack 214 according to one embodiment. Data traffic may be received in a packet buffer 405. The link aggregation transmitter 210 may receive lower layer metrics from the WWAN and WLAN stacks 212, 214, and the link aggregation transmitter 210 may explicitly determine a bearer split policy, which may specify the proportion of data traffic to be transmitted over each stack. The link aggregation transmitter 210 may then split the data traffic according to the bearer split policy. The link aggregation transmitter 210 may push the split data to packet buffers 432, 434 for each stack 212, 214. The WWAN and WLAN stacks 212, 214 may process and transmit the data from the packet buffers 432, 434. WWAN and WLAN schedulers 452, 454 may schedule transmission of the data and may request data from the packet buffers 432, 434 for the WWAN and WLAN stacks 212, 214. In some embodiments, the schedulers 452, 454 may exchange scheduling metrics and may loosely synchronize transmissions by the WWAN and WLAN stacks 212, 214.

Returning to FIG. 3, the transmission queue 314 may be referred to herein as Q1 and is a first-in first-out (FIFO) queue to store the new PDU (packets) awaiting transmission or not confirmed by a corresponding lower layer protocol. The retransmission queue 316 may be referred to herein as Q2 and is a FIFO queue to store the retransmitted PDU not confirmed by a lower layer protocol. For discussion purposes, the following parameters are also defined: C1 is WLAN congestion status (e.g., 0: no congestion, 1: congested); C2 is WWAN (e.g., LTE) congestion status (e.g., 0: no congestion, 1: congested); n1 is the number of PDUs in Q1 waiting for transmission; and n2 is the number of PDUs in Q2 waiting for retransmission. The retransmission timer 318 indicates a maximum time that the system will wait for confirmation of a PDU from the lower layer before triggering retransmission. In certain embodiments, the retransmission timer is only for PDUs that are initially transmitted over the WLAN link.

Figure 5A:
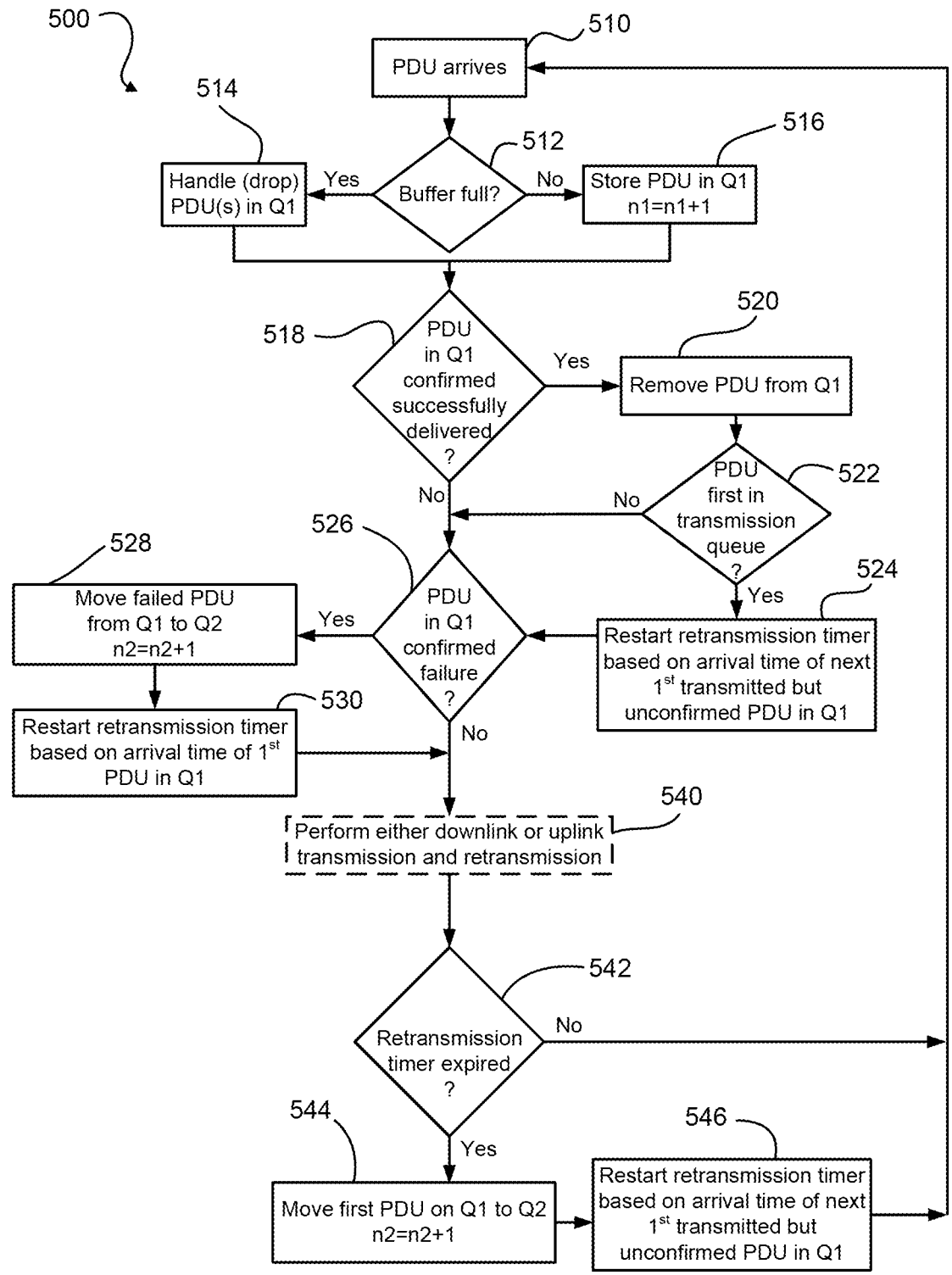
FIG. 5A is a flowchart illustrating a method for bearer splitting and cross-RAT retransmission according to one embodiment.
Figure 5B:
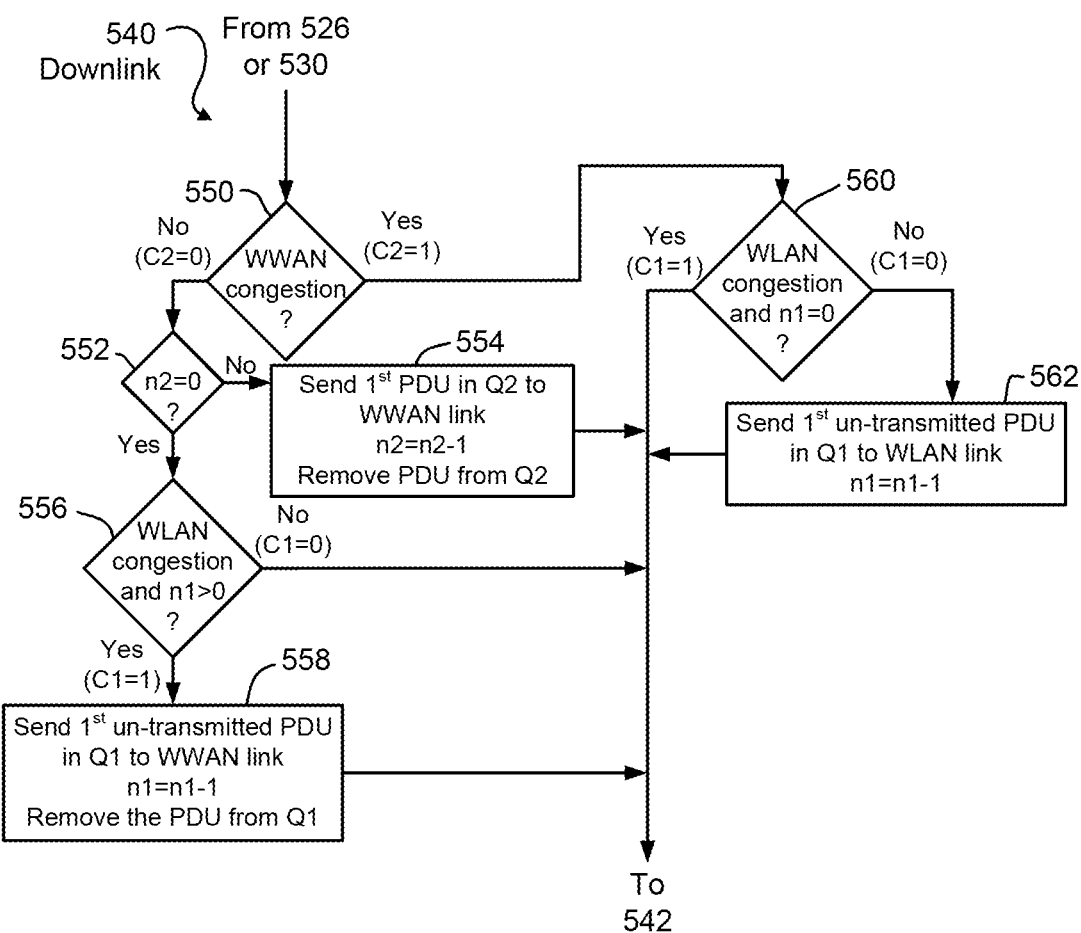
FIG. 5B is a flowchart illustrating downlink-specific transmission and retransmission portions of the method shown in FIG. 5A.
Figure 5C:
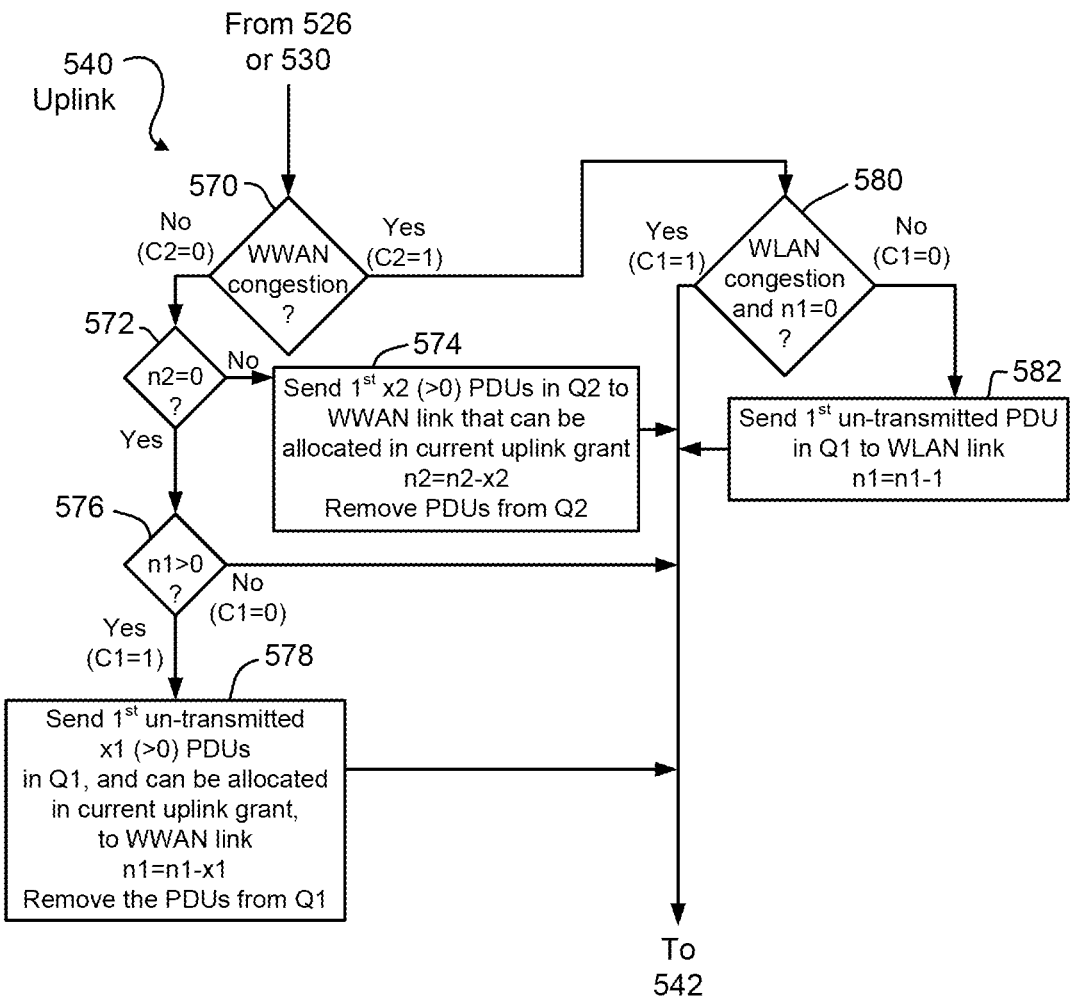
FIG. 5C is a flowchart illustrating uplink-specific transmission and retransmission portions of the method shown in FIG. 5A.

FIG. 5A is a flowchart illustrating a method 500 for bearer splitting and cross-RAT retransmission according to one embodiment. FIG. 5B is a flowchart illustrating downlink-specific transmission and retransmission portions of the method 500 shown in FIG. 5A. FIG. 5C is a flowchart illustrating uplink-specific transmission and retransmission portions of the method 500 shown in FIG. 5A. Downlink refers to the communication links from the eNB 120 to the UE 110 and uplink refers to the communication links from the UE 110 to the eNB 120 shown in FIG. 1. Thus, for example, a link aggregation transmitter 210 operating on the eNB 120 performs the illustrated method 500 shown in FIGS. 5A and 5B, while a link aggregation transmitter 210 operating on the UE 110 performs the illustrated method 500 shown in FIGS. 5A and 5C.

When a PDU arrives 510, the method 500 queries 512 whether the buffer corresponding to Q1 and Q2 is full. If the buffer is full, the method 500 determines 514 how to handle (e.g., drop) the PDUs in Q1 based on various quality of service (QoS) requirements of the PDUs, such as delay, priority, and other QoS requirements. If, however, the new PDU is accepted, the method 500 stores 516 the new PDU in Q1 and sets n1=n1+1 to track un-transmitted packets and transmitted packets in the transmission queue. In one embodiment, the method 500 assigns the next available sequence number (SN) to the new PDU upon placing it in Q1. In other embodiments, the next available SN is assigned to the PDU when the PDU is ready for initial transmission in FIG. 5B or FIG. 5C.

The method 500 also queries whether a PDU in Q1 is confirmed "successfully delivered" (e.g., by lower layer protocols). If the PDU in Q1 is successfully delivered, the method 500 removes 520 the PDU from Q1, and queries 522 whether the removed PDU was the first in Q1 (based on the sequential order defined by the FIFO nature of the transmission queue 314). If the removed PDU was the first in Q1, the method 500 restarts 524 the retransmission timer 318 based on the arrival time of the next first transmitted but un-confirmed PDU in Q1. In certain embodiments, a PDU is removed immediately from Q1 if it is sent to the WWAN link, and the retransmission timer 318 is only for PDUs that are initially sent over the WLAN link.

The method 500 also queries 526 whether a PDU in Q1 is confirmed "failure (loss)" (e.g., by lower layer protocols). If the PDU in Q1 is confirmed as having failed to be delivered or lost, the method moves 528 the failed PDU from Q1 to Q2 and sets n2=n2+1 to track the number of PDUs in Q2 awaiting retransmission. In certain embodiments, the method 500 only moves the failed PDU from Q1 to Q2 if the PDU was originally transmitted on the WLAN link because it is assumed that the WWAN link (e.g., LTE link) is reliable and/or is configured to handle lost or failed packets using other methods. The method 500 then restarts 530 the retransmission timer 318 based on the first PDU in Q1.

As discussed above, the method 500 performs 540 either downlink (e.g., if operating on the eNB 120) or uplink (e.g., if operating on the UE 110) transmission and retransmission. FIG. 5B illustrates how the method 500 performs 540 downlink transmission and retransmission. For downlink, the method 500 queries 550 whether there is congestion on the WWAN link (e.g., as indicated by the WWAN lower layer protocol), and queries 552 whether n2=0. If no to both queries (i.e., C2==0 && n2>0), the method 500 sends 554 the first PDU in Q2 to the WWAN link, sets n2=n2-1, and removes the PDU from Q2. Thus, the link aggregation transmitter 210 performs cross-RAT retransmission of failed packets originally transmitted on the WLAN link by retransmitting the failed packets on the more reliable WWAN link.

If the WWAN link is not congested and n2=0, the method 500 also queries 556 whether there is congestion on the WLAN link (e.g., as indicated by the WLAN lower layer protocol) and n1>0. If the WLAN is congested and n1>0, then the method 500 responds to these conditions (C1==1 && C2==0 && n1>0 && n2==0) by (if allowed by the current transmission window) sending 558 the first PDU in Q1 that has not been transmitted to the WWAN link, setting n1=n1-1, and removing the PDU from Q1.

If querying 550 determines that there is congestion on the WWAN link, the method 500 also queries 560 whether there is congestion on the WLAN link (e.g., as indicated by the WLAN lower layer protocol) and n1=0. If not, and if allowed by the current transmission window, the method 500 responds to these conditions (i.e., C1==0 && C2==1 && n1>0) by sending 562 the first PDU in Q1 that has not been transmitted to the WLAN link, and sets n1=n1-1.

Returning to FIG. 5A, which applies to both downlink and uplink communication, the method 500 queries 542 whether the retransmission timer 318 is expired. If yes, the method 500 moves 544 the first PDU in Q1 to Q2, sets n2=n2+1, and restarts the retransmission timer 318 based on the arrival time of the next first transmitted but un-confirmed PDU in Q1. As shown in FIG. 5A, if none of the conditions is applicable, the method 500 does nothing and waits (e.g., repeating).

In the discussion of FIGS. 5A and 5B, it is assumed that the link aggregation transmitter 210 gets a transmission confirmation from the lower layer protocol, e.g., WLAN MAC, 3GPP RLC/MAC, for each PDU that has been sent to the WWAN link or WLAN link. The transmission confirmation indicates whether the PDU is transmitted successfully or not.

In certain embodiments, the link aggregation transmitter 210 may get the WLAN link congestion status from WLAN MAC. The WLAN MAC may keep a local queue to store all the packets that it receives from the link aggregation transmitter, but that have not been sent to the air yet. Where "y" indicates the number of packets in the queue, $TH_H$ is the WLAN congestion detection high threshold (in packets or bytes or milliseconds (ms)), and $TH_L$ is the WLAN congestion detection low threshold (in packets or bytes or ms), the WLAN congestion detection algorithm may work as follows:

if ($y>TH_H$ && C1==0), C1=1; and if ($y<TH_L$ && C1==1), C1=0.

Alternatively, the link aggregation transmitter 210 determines the WLAN link congestion status locally based on y' which is the number of PDUs that are sent to the WLAN link, waiting for transmission confirmation. Thus the WLAN congestion detection algorithm may work as follows:

if ($y'>TH_H$ && C1==0), C1=1; and if ($y'<TH_L$ && C1==1), C1=0.

$TH_H$ and $TH_L$ may be set according to the available bandwidth of the WLAN link and the control latency (round trip time) between the link aggregation transmitter 210 and the WLAN MAC, especially if WLAN access point (AP) is not co-located with cellular eNB.

Wireless mobile communication technology uses various standards and protocols to transmit data between a base station and a wireless communication device. Wireless wide area network (WWAN) communication system standards and protocols can include, for example, the 3rd Generation Partnership Project (3GPP) long term evolution (LTE), and the Institute of Electrical and Electronics Engineers (IEEE) 802.16 standard, which is commonly known to industry groups as worldwide interoperability for microwave access (WiMAX™). Wireless local area network (WLAN) can include, for example, the IEEE 802.11 standard, which is commonly known to industry groups as Wi-Fi™. Other WWAN and WLAN standards and protocols are also known.

The WWAN link congestion status may be based on HARQ information. If all HARQ processes are busy, C2=1; otherwise, C2=0.

If the WLAN AP and the eNB 120 are not co-located and the delay between the link aggregation transmitter 210 and the WLAN MAC is not negligible, e.g., about 5 ms to about 30 ms, the link aggregation transmitter 210 may set the (cross-RAT) retransmission timer 318 longer to take such delay into consideration.

In addition, or in other embodiments, the WLAN MAC may configure its congestion detecting algorithm properly to prevent the congestion notification from changing too fast. For example, after signaling "congested," the WLAN MAC may stay "congested" for a minimal time interval, and this interval may be longer than the round trip time between the WLAN MAC and the link aggregation transmitter 210.

Turning now to uplink bearer splitting and cross-RAT retransmission, certain differences between uplink and downlink embodiments are described. While the uplink bearer split and cross-RAT retransmission may follow the same principles as that of downlink, there are some differences that use an alternate strategy. In the uplink, before sending any traffic over the WWAN link (e.g., LTE link), the UE 110 first sends a "buffer status report (BSR)" to the eNB 120 to indicate how much uplink grant the UE 110 estimates that it needs. Generally, the BSR for LTE communication is based on all the packets waiting for transmission in the PDCP and RLC buffer. However, with uplink bearer splitting in a RAN-based WLAN/WWAN integrated network, some of the packets may be sent over the WLAN link, and it may be difficult to determine the total number of bytes that will be sent over the WWAN link. Hence, according to certain embodiments, an eNB-assisted UE-controlled bearer split control algorithm is provided.

The eNB 120 may determine the uplink split based on various link quality, loading, and congestion parameters observed across many or all associated users. The eNB 120 may also determine a joint allocation across WWAN and WLAN resources. However, the format of the resource allocation notification for WLAN may be different than that for WWAN. As an example embodiment, the eNB 120 may assign a specific "probability of transmission" over the WLAN link, which may be then used by the UE 110 to back off from contending on the WLAN 180.

An alternate embodiment is based on the UE 110 estimating the number of bytes to request for WWAN BSR based on the eNB-determined traffic split parameters.

In one embodiment, a link aggregation-aware BSR procedure is provided for uplink bearer splitting and cross-RAT retransmission. For discussion purposes, the following parameters are defined for the link aggregation BSR procedure: m1 is the total number of bytes for the packets in Q1 that are within the transmission window waiting for transmission; m2 is the total number of bytes for the packets in Q1 that have been sent to WLAN but without confirmation; m3 is the total number of bytes for the packets in Q2 waiting for transmission; p1 is the estimated traffic splitting ratio for the WWAN link (e.g., LTE link); p2 is the estimated retransmission rate for the WLAN link; and z is the estimated number of bytes that will be sent over the WWAN link. Based on these parameters:

$z = m1 \times p1 + m2 \times p2 + m3.$

If cross-RAT retransmission is not supported, m3=0 and p2=0, and the above equation reduces to:

$z = m1 \times p1.$

The UE 110 determines the BSR based on "z," as well as any other traffic waiting for transmissions at the lower layer, e.g., at the RLC protocol layer.

The UE 110 keeps monitoring Q1 and Q2 to get m1 and m2. The eNB 120 determines p1 and p2, and sends control messages, e.g., RRC messages, MAC control header, etc. to notify the UE 110 of the latest p1 and p2 values. For example, with p1=0 and p2=0, the eNB 120 enforces all new transmissions over the WLAN link, and only allows (cross-RAT) retransmission over the WWAN link. In another example, with p1=1 and p2=1, the eNB 120 allows the UE 110 to use the WWAN link for its uplink traffic as much as possible.

In certain embodiments, when the UE 110 receives an uplink grant, the UE 110 follows the following priority for allocation: first, packets waiting for transmissions at the LTE lower layer; second, cross-RAT retransmitted packets ("the packets in Q2"); third, new packets that have not been sent to the WLAN link or the WWAN link (i.e., the packets in Q1 that have not been transmitted to WLAN or WWAN); and fourth, new packets that have been sent to the WLAN link, but without confirmation (i.e., the packets in Q1 that have been transmitted to WLAN, but without confirmation).

In certain embodiments, the WWAN MAC or RLC layer signals "$O2=0$" to the link aggregation transmitter 210 of the UE 110 once an uplink grant has arrived. In addition, or in other embodiments, the WWAN MAC or RLC layer signals the amount of resources available in the uplink grant so that the link aggregation transmitter 120 of the UE 110 can assign the PDUs to the WWAN link accordingly. The link aggregation transmitter then resets "$C2=1$." In certain embodiments, the procedure for determining the WLAN link status (C1) is the same in the uplink as it is in the downlink.

Referring to FIGS. 5A and 5C, FIG. 5C illustrates how the method 500 performs 540 the uplink transmission and retransmission. For uplink, the method 500 queries 570 whether there is congestion on the WWAN link (e.g., as indicated by the WWAN lower layer protocol), and queries 572 whether $n2=0$. If no to both queries (i.e., $C2==0$ && $n2>0$), the method 500 sends 574 as many of the first $x2$ ($>0$) number of PDUs in Q2 to the WWAN link as can be allocated in the current uplink grant, sets $n2=n2-x2$, and removes the PDUs from Q2. Thus, the link aggregation transmitter 210 performs cross-RAT retransmission of failed packets originally transmitted on the WLAN link by retransmitting the failed packets on the more reliable WWAN link.

If the WWAN link is not congested and $n2=0$, the method 500 also queries 576 whether $n1>0$. If yes, then the method 500 responds to these conditions ($C2==0$ && $n1>0$ && $n2==0$) by (if allowed by the current transmission window) sending 578 the first $x1$ ($>0$) number of PDUs in Q1 that have not been transmitted, and that can be allocated in the current uplink grant, to the WWAN link, setting $n1=n1-x1$, and removing the PDUs from Q1.

If the WWAN is congested, the method 500 also queries 580 whether there is congestion on the WLAN link (e.g., as indicated by the WLAN lower layer protocol) and $n1=0$. If not ($C1==0$ && $C2==1$ && $n1>0$), and if allowed by the current transmission window, the method 500 sends 582 the first PDU in Q1 that has not been transmitted to the WLAN link, and sets $n1=n1-1$.

Thus, the link aggregation transmitter 210 first fills up the current uplink grant on the WWAN link, and then uses the WLAN link. If the UE 110 does not have enough data to completely fill a resource allocation from the eNB 120, the unused space may be referred to as "padding." If the padding space is large enough to accommodate a BSR, according to certain embodiments, the UE 110 sends a "padding BSR." In this case, the buffer status is set to "0." As a result, the eNB 120 knows that the UE 110 has no more traffic to send over the WWAN link.

In certain embodiments, the eNB 120 sends the following per UE and per bearer configuration parameters in RRC messages or MAC control header or any other control message to the UE 110 for the uplink bearer splitting algorithm: $TH_H$, $TH_L$, p1, and p2, as defined above.

As used herein, the term "circuitry" may refer to, be part of, or include an Application Specific Integrated Circuit (ASIC), an electronic circuit, a processor (shared, dedicated, or group), and/or memory (shared, dedicated, or group) that executes one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 6 illustrates, for one embodiment, example components of a UE device 600. In some embodiments, the UE device 600 may include application circuitry 602, baseband circuitry 604, Radio Frequency (RF) circuitry 606, front-end module (FEM) circuitry 608 and one or more antennas 610, coupled together at least as shown.

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) 604d for other existing generations or generations in development or to be developed in the future (e.g., fifth generation (5G), 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP, and/or RRC layers. In some embodiments, the baseband circuitry 604 may include one or more audio digital signal processor(s) (DSP) 604f. The audio DSP(s) 604f may include elements for compression/decompression and echo cancellation and may include other suitable processing elements in other embodiments. Components of the baseband circuitry 604 may be suitably combined in a single chip or single chipset, or disposed on a same circuit board in some embodiments. In some embodiments, some or all of the constituent components of the baseband circuitry 604 and the application circuitry 602 may be implemented together, such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) and/or other wireless metropolitan area networks (WMAN), a wireless local area network (WLAN), or a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc., to facilitate the communication with the wireless network. RF circuitry 606 may include a receive signal path, which may include circuitry to down-convert RF signals received from the FEM circuitry 608 and provide baseband signals to the baseband circuitry 604. RF circuitry 606 may also include a transmit signal path, which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b, and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals, and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In these alternative embodiments, the RF circuitry 606 may include analog-to-digital converter (ADC) and digital-to-analog converter (DAC) circuitry, and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect, as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N−1 synthesizer.

In some embodiments, frequency input may be provided by a voltage controlled oscillator (VCO), although that is not a requirement. Divider control input may be provided by either the baseband circuitry 604 or the application circuitry 602, depending on the desired output frequency. In some embodiments, a divider control input (e.g., N) may be determined from a look-up table based on a channel indicated by the application circuitry 602.

Synthesizer circuitry 606d of the RF circuitry 606 may include a divider, a delay-locked loop (DLL), a multiplexer, and a phase accumulator. In some embodiments, the divider may be a dual modulus divider (DMD), and the phase accumulator may be a digital phase accumulator (DPA). In some embodiments, the DMD may be configured to divide the input signal by either N or N+1 (e.g., based on a carry-out) to provide a fractional division ratio. In some example embodiments, the DLL may include a set of cascaded, tunable, delay elements; a phase detector; a charge pump; and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals, and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610.

In some embodiments, the FEM circuitry 608 may include a TX/RX switch to switch between transmit mode and receive mode operation. The receive signal path of the FEM 608 circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the UE device 600 may include additional elements, such as, for example, memory/storage, a display, a camera, a sensor, and/or an input/output (I/O) interface.

EXAMPLES

The following examples pertain to further embodiments.

Example 1 is an apparatus for communication through a wireless wide area network (WWAN) link and a wireless local area network (WLAN) link. The apparatus includes a first packet buffer to receive bearer traffic and a link aggregation transmitter. The a link aggregation transmitter includes a cross-layer signal component to: receive, from a WLAN stack lower layer protocol, a WLAN transmission confirmation signal and a WLAN congestion status; and receive, from a WWAN stack lower layer protocol, a WWAN transmission confirmation signal and a WWAN congestion status. The apparatus also includes a bearer splitting component to dynamically split the bearer traffic across the WWAN link and the WLAN link based at least in part on the WLAN transmission confirmation signal, the WLAN congestion status, and the WWAN congestion status.

Example 2 includes the apparatus of Example 1, wherein the link aggregation transmitter further includes a retransmission timer to indicate a maximum time that the link aggregation transmitter is configured to wait for the WLAN transmission confirmation signal; and at least one second packet buffer comprising: a transmission queue to store new packets awaiting transmission or confirmation of successful transmission, as indicated by the WLAN transmission confirmation signal or the WWAN transmission confirmation signal, wherein the new packets are stored according to a sequential order of reception in the first packet buffer; and a retransmission queue to store retransmitted packets awaiting retransmission through the WWAN link.

Example 3 includes the apparatus of any of Examples 1-2, wherein the bearer splitting component is configured to: accept the new packets received in the first packet buffer for transmission; add the accepted new packets to the transmission queue in the sequential order; track un-transmitted packets and transmitted packets in the transmission queue, the un-transmitted packets waiting to be initially transmitted through the WWAN link or the WLAN link, and the transmitted packets waiting to be confirmed by the WLAN transmission confirmation signal, the retransmission timer set based on a first transmitted packet with priority in the transmission queue according to the sequential order; and in response to respective confirmations of successful transmission of the transmitted packets, remove successfully transmitted packets from the transmission queue, wherein after removal of the first transmitted packet the retransmission timer is reset based on a second transmitted packet remaining in the transmission queue with priority according to the sequential order.

Example 4 includes the apparatus of any of Examples 1-3, wherein the bearer splitting component is further configured to: identify, based on an expiration of the retransmission timer or a failure indication from the WLAN transmission confirmation signal, a failed packet transmitted over the WLAN link; move the failed packet from the transmission queue to the retransmission queue; and restart the retransmission timer based on a priority packet in the transmission queue according to the sequential order.

Example 5 includes the apparatus of any of Examples 1-4, wherein the bearer splitting component is further configured to: in response to an indication in the WWAN congestion status of below threshold congestion on the WWAN link when a failed packet is in the retransmission queue, send the failed packet to the WWAN link; and remove the failed packet from the retransmission queue.

Example 6 includes the apparatus of any of Examples 1-5, wherein the bearer splitting component is further configured to: if the WLAN congestion status indicates below threshold congestion on the WLAN link and one or more of the new packets in the transmission queue are awaiting transmission, send a first un-transmitted packet according to the sequential order in the transmission queue to the WLAN link; and if the WLAN congestion status indicates above threshold congestion on the WLAN link and the WWAN congestion status indicates below threshold congestion on the WWAN link when the retransmission queue is empty, send the first new packet to the WWAN link and remove the first new packet from the transmission queue.

Example 7 includes the apparatus of any of Examples 1-6, wherein the cross-layer signal component is further configured to receive the WLAN congestion status from the WLAN stack lower layer protocol.

Example 8 includes the apparatus of any of Examples 1-6, wherein the link aggregation transmitter is further configured to determine the WLAN congestion status based on a number of packets sent to the WLAN link that are awaiting confirmation or a delay in sending packets to the WLAN link and receiving corresponding confirmations.

Example 9 includes the apparatus of any of Examples 1-8, wherein the cross-layer signal component is further configured to receive the WWAN congestion status from the WWAN stack lower layer protocol.

Example 10 includes the apparatus of any of Examples 1-9, wherein the link aggregation transmitter is configured to determine the WWAN congestion status based on hybrid automatic repeat request (HARQ) information.

Example 11 includes the apparatus of any of Examples 1-10, wherein the apparatus comprises a an evolved universal terrestrial radio access network (E-UTRAN) Node B (eNB), wherein the bearer traffic comprises downlink packets to transmit from the eNB to a user equipment (UE), and wherein the bearer splitting component dynamically splits the bearer traffic across the WWAN link and the WLAN link without the eNB receiving feedback from the UE.

Example 12 includes the apparatus of any of Examples 1-4 or 7-10, wherein the apparatus comprises a user equipment (UE), wherein the bearer traffic comprises uplink packets to transmit from the UE to an evolved universal terrestrial radio access network (E-UTRAN) Node B (eNB), wherein the UE is configured to send a buffer status report (BSR) message to the eNB and receive in response an uplink grant, and wherein the bearer splitting component is further configured to: determine an estimated number of bytes to send over the WWAN link based on traffic split parameters provided to the UE by the eNB, the estimated number of bytes to include in the BSR message; and dynamically split the bearer traffic across the WWAN link and the WLAN link according to a set of priority rules for using the uplink grant.

Example 13 includes the apparatus of Example 12, wherein the bearer splitting component is configured to: estimate number of bytes z according to: $z=m1 \times p1+m2 \times p2+m3$, where: m1 is the total number of bytes of the un-transmitted packets in the transmission queue; m2 is the total number of bytes of the transmitted packets in the transmission queue awaiting confirmation; m3 is total number of bytes of the packets in the retransmission queue; p1 is an estimated traffic splitting ratio parameter for the WWAN link provided by the eNB; and p2 is an estimated retransmission rate for the WLAN link provided by the eNB.

Example 14 includes the apparatus any of Examples 12-13, wherein the set of priority rules for the uplink grant comprises: give first priority for transmission over the WWAN link to a first group of packets, if any, previously provided to the WWAN stack lower layer protocol; give second priority for transmission over the WWAN link to a second group of packets, if any, in the retransmission queue; give third priority for transmission over the WWAN link to a third group of packets, if any, to the un-transmitted packets in the transmission queue; and give fourth priority for transmission over the WWAN link to a fourth group of packets, if any, to packets transmitted over the WLAN link and in the transmission queue awaiting confirmation.

Example 15 includes the apparatus of any of Examples 1-4 or 7-10, wherein the apparatus comprises a user equipment (UE), wherein the bearer traffic comprises uplink packets to transmit from the UE to an evolved universal terrestrial radio access network (E-UTRAN) Node B (eNB), and wherein the bearer splitting component is further configured to: receive, from the WWAN stack lower layer protocol, an indication of available uplink resources in an uplink grant from the eNB; in response to the WWAN congestion status indicating that there is below threshold congestion on the WWAN link and that there are one or more failed packets in the retransmission queue, send as many of the one or more failed packets as are allowed by the available uplink resources to the WWAN link; and remove each of the one or more failed packets sent to the WWAN from the retransmission queue.

Example 16 includes the apparatus of Example 15, wherein the bearer splitting component is further configured to: if the WWAN congestion status indicates above threshold congestion on the WWAN link and a WLAN congestion status indicates below threshold congestion on the WLAN link when one or more of the new packets in the transmission queue are awaiting transmission, send a first new packet according to the sequential order in the transmission queue to the WLAN link; and if the WWAN congestion status indicates below threshold congestion on the WWAN link when the retransmission queue is empty, send as many of the un-transmitted packets in the transmission queue as are allowed by the available uplink resources to the WWAN link, and remove each of the un-transmitted packets sent to the WWAN link from the transmission queue.

Example 17 includes the apparatus of any of Examples 15-16, wherein the bearer splitting component is further configured to: determine an unused portion of the available uplink resources; and send, to the WWAN link, a buffer status report (BSR) for transmission in the unused portion of the available uplink resources, the BSR indicating that the UE has no additional traffic to send over the WWAN link.

Example 18 includes the apparatus of any of Examples 15-17, wherein the UE comprises at least one of a speaker, a microphone, a connection port, a keyboard, a touch screen, a battery, a memory port, and one or more antennas.

Example 19 is a user equipment (UE) including a first wireless interface to communicate using a first radio access technology (RAT), a second wireless interface to communicate using a second RAT, and a processor to provide cross-RAT retransmission of uplink traffic. The processor is configured to: identify one or more packets transmitted on the second RAT that have been confirmed as undelivered or that have not been confirmed as delivered within a predetermined time period; receive, from an evolved universal terrestrial radio access network (E-UTRAN) Node B (eNB), an uplink grant of resources for the first RAT; and in response to an indication that congestion on the first RAT is below a threshold value, send as many of the one or more packets as are allowed by the uplink grant through the first RAT.

Example 20 includes the UE of Example 19, wherein the processor is further configured to: determine an unused portion of the resources indicated in the uplink grant; and send a buffer status report (BSR) in the unused portion of the resources indicated in the uplink grant; the BSR indicating that the UE has no current traffic to send through the first RAT.

Example 21 includes the UE of any of Examples 19-20, wherein the processor is further configured to receive a congestion status message from a protocol stack lower layer of the first wireless interface, the congestion status message to provide the indication that congestion on the first RAT is below a threshold value.

Example 22 includes the UE of any of Examples 19-20, wherein the processor is further configured to determine the indication that congestion on the first RAT is below a threshold value based on hybrid automatic repeat request (HARQ) information.

Example 23 includes the UE of any of Examples 19-22, wherein the processor is configured to: determine an estimated number of bytes to send using the first RAT based on traffic split parameters provided to the UE by the eNB, the estimated number of bytes to include in a buffer status report (BSR) request for the uplink grant, the traffic split parameters comprising: an estimated traffic splitting ratio parameter between the first RAT and the second RAT; and an estimated retransmission rate for the second RAT.

Example 24 includes at least one computer-readable storage medium having stored thereon instructions that, when executed by one or more processors, cause the one or more processors to perform operations comprising: store, in a transmission queue of one or more buffers, downlink packets awaiting confirmation of successful transmission in one of a third generation partnership project (3GPP) network and a non-3GPP network; determine that one or more of the downlink packets are failed packets based on at least one of a lower layer indication of packet loss and an expired timer without receiving the lower layer indication of packet loss; move the failed packets from the transmission queue to a retransmission queue of the one or more buffers; in response to a determination that congestion on the 3GPP network is below a threshold level, provide the failed packets to a 3GPP link for retransmission through the 3GPP network; and remove the failed packets from the retransmission queue.

Example 25 includes the at least one computer-readable storage medium of Example 24, wherein the operations further comprise: receive a congestion status message from a protocol stack lower layer of 3GPP network, the congestion status message to provide the determination that congestion on the 3GPP network is below the threshold level.

Example 26 includes the at least one computer-readable storage medium of Example 24, wherein the determination that congestion on the 3GPP network is below a threshold value is based on hybrid automatic repeat request (HARQ) information.

Example 27 is a method for communication through a wireless wide area network (WWAN) link and a wireless local area network (WLAN) link. The method includes receiving, from a WLAN stack lower layer protocol, a WLAN transmission confirmation signal and a WLAN congestion status. The method also includes receiving, from a WWAN stack lower layer protocol, a WWAN transmission confirmation signal and a WWAN congestion status. The method further includes dynamically splitting bearer traffic across the WWAN link and the WLAN link based at least in part on the WLAN transmission confirmation signal, the WLAN congestion status, and the WWAN congestion status.

Example 28 includes the method of Example 27, further comprising: storing, in a transmission queue, new packets awaiting transmission or confirmation of successful transmission, as indicated by the WLAN transmission confirmation signal or the WWAN transmission confirmation signal, wherein the new packets are stored according to a sequential order of reception in the first packet buffer; and storing, in a retransmission queue, retransmitted packets awaiting retransmission through the WWAN link.

Example 29 includes the method of any of Examples 27-28, further comprising: accepting the new packets received in the first packet buffer for transmission; adding the accepted new packets to the transmission queue in the sequential order; tracking un-transmitted packets and transmitted packets in the transmission queue, the un-transmitted packets waiting to be initially transmitted through the WWAN link or the WLAN link, and the transmitted packets waiting to be confirmed by the WLAN transmission confirmation signal; setting a retransmission timer based on a first transmitted packet with priority in the transmission queue according to the sequential order; and in response to respective confirmations of successful transmission of the transmitted packets, removing successfully transmitted packets from the transmission queue, wherein after removal of the first transmitted packet the retransmission timer is reset based on a second transmitted packet remaining in the transmission queue with priority according to the sequential order.

Example 30 includes the method of any of Examples 27-29, further comprising: identifying, based on an expiration of a retransmission timer or a failure indication from the WLAN transmission confirmation signal, a failed packet transmitted over the WLAN link; moving the failed packet from the transmission queue to the retransmission queue; and restarting the retransmission timer based on a priority packet in the transmission queue according to the sequential order.

Example 31 includes the method of any of Examples 27-30, further comprising: sending, in response to an indication in the WWAN congestion status of below threshold congestion on the WWAN link when a failed packet is in the retransmission queue, the failed packet to the WWAN link; and removing the failed packet from the retransmission queue.

Example 32 includes the method of any of Examples 27-31, further comprising: sending, if the WLAN congestion status indicates below threshold congestion on the WLAN link and one or more of the new packets in the transmission queue are awaiting transmission, a first un-transmitted packet according to the sequential order in the transmission queue to the WLAN link; and sending, if the WLAN congestion status indicates above threshold congestion on the WLAN link and the WWAN congestion status indicates below threshold congestion on the WWAN link when the retransmission queue is empty, the first new packet to the WWAN link and remove the first new packet from the transmission queue.

Example 33 includes the method of any of Examples 27-32, further comprising receiving the WLAN congestion status from the WLAN stack lower layer protocol.

Example 34 includes the method of any of Examples 27-33, further comprising determining the WLAN congestion status based on a number of packets sent to the WLAN link that are awaiting confirmation or a delay in sending packets to the WLAN link and receiving corresponding confirmations.

Example 35 includes the method of Example 28, further comprising receiving the WWAN congestion status from the WWAN stack lower layer protocol.

Example 36 includes the method of Example 28, further comprising determining the WWAN congestion status based on hybrid automatic repeat request (HARQ) information.

Example 37 includes the method of any of Examples 27-36, wherein the bearer traffic comprises downlink packets to transmit from a base station to a user equipment (UE), and wherein the method further comprises dynamically splitting the bearer traffic across the WWAN link and the WLAN link without the base station receiving feedback from the UE.

Example 38 includes the method of any of Examples 27-36, wherein the bearer traffic comprises uplink packets to transmit from a user equipment (UE) to a base station, wherein the UE is configured to send a buffer status report (BSR) message to the base station and receive in response an uplink grant, and wherein the method further comprises: determining an estimated number of bytes to send over the WWAN link based on traffic split parameters provided to the UE by the base station, the estimated number of bytes to include in the BSR message; and dynamically splitting the bearer traffic across the WWAN link and the WLAN link according to a set of priority rules for using the uplink grant.

Example 39 includes the method of Example 38, further comprising: estimating a number of bytes z according to: $z = m1 \times p1 + m2 \times p2 + m3$, where: m1 is the total number of bytes of the un-transmitted packets in the transmission queue; m2 is the total number of bytes of the transmitted packets in the transmission queue awaiting confirmation; m3 is total number of bytes of the packets in the retransmission queue; p1 is an estimated traffic splitting ratio parameter for the WWAN link provided by the base station; and p2 is an estimated retransmission rate for the WLAN link provided by the base station.

Example 40 includes the method of any of Examples 38-39, wherein the set of priority rules for the uplink grant comprises: giving first priority for transmission over the WWAN link to a first group of packets, if any, previously provided to the WWAN stack lower layer protocol; giving second priority for transmission over the WWAN link to a second group of packets, if any, in the retransmission queue; giving third priority for transmission over the WWAN link to a third group of packets, if any, to the un-transmitted packets in the transmission queue; and giving fourth priority for transmission over the WWAN link to a fourth group of packets, if any, to packets transmitted over the WLAN link and in the transmission queue awaiting confirmation.

Example 41 includes the method of any of Examples 27-40, wherein the bearer traffic comprises uplink packets to transmit from a user equipment (UE) to a base station, and wherein the method further comprises: receiving, from the WWAN stack lower layer protocol, an indication of available uplink resources in an uplink grant from the base station; sending, in response to the WWAN congestion status indicating that there is below threshold congestion on the WWAN link and that there are one or more failed packets in the retransmission queue, as many of the one or more failed packets as are allowed by the available uplink resources to the WWAN link; and removing each of the one or more failed packets sent to the WWAN from the retransmission queue.

Example 42 includes the method of Example 41, further comprising: sending, if the WWAN congestion status indicates above threshold congestion on the WWAN link and a WLAN congestion status indicates below threshold congestion on the WLAN link when one or more of the new packets in the transmission queue are awaiting transmission, a first new packet according to the sequential order in the transmission queue to the WLAN link; and sending, if the WWAN congestion status indicates below threshold congestion on the WWAN link when the retransmission queue is empty, as many of the un-transmitted packets in the transmission queue as are allowed by the available uplink resources to the WWAN link, and removing each of the un-transmitted packets sent to the WWAN link from the transmission queue.

Example 43 includes the method of Example 42, further comprising: determining an unused portion of the available uplink resources; and sending, to the WWAN link, a buffer status report (BSR) for transmission in the unused portion of the available uplink resources, the BSR indicating that the UE has no additional traffic to send over the WWAN link.

Example 44 is an apparatus comprising means to perform a method as in any of Examples 27-43.

Example 45 is at least one computer-readable storage medium having stored thereon computer-readable instructions, when executed, to implement a method or realize an apparatus as in any of Examples 27-44.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

It will be understood by those having skill in the art that many changes may be made to the details of the above-described embodiments without departing from the underlying principles of the invention. The scope of the present invention should, therefore, be determined only by the following claims.

The invention claimed is:

1. An apparatus comprising a UE for communication through a wireless wide area network (WWAN) link and a wireless local area network (WLAN) link, the UE configured to send a buffer status report (BSR) message to an evolved universal terrestrial radio access network (E-UTRAN) Node B (eNB) and receive in response an uplink grant, the apparatus comprising:
 a first packet buffer to receive bearer traffic comprising uplink packets to transmit from the UE to the eNB;
 a link aggregation transmitter comprising:
  a cross-layer signal component configured to:
   receive, from a WLAN stack lower layer protocol, a WLAN transmission confirmation signal and a WLAN congestion status; and
   receive, from a WWAN stack lower layer protocol, a WWAN transmission confirmation signal and a WWAN congestion status; at least one second packet buffer comprising:
    a transmission queue to store new packets awaiting transmission or confirmation of successful transmission, as indicated by the WLAN transmission confirmation signal or the WWAN transmission confirmation signal; and
    a retransmission queue to store one or more failed packets awaiting retransmission through the WWAN link that were originally transmitted through the WLAN link;
  a bearer splitting component configured to:
  determine an estimated number of bytes z to send over the WWAN link based on traffic split parameters provided to the UE by the eNB, the estimated number of bytes z to be included in the BSR message and determined according to:

$z = m1 \times p1 + m2 \times p2 + m3$, where:

m1 is the total number of bytes of the un-transmitted packets in a transmission queue of a second packet buffer;
 m2 is the total number of bytes of the transmitted packets in the transmission queue awaiting confirmation;
 m3 is total number of bytes of the packets in a retransmission queue of the second packet buffer;
 p1 is an estimated traffic splitting ratio parameter for the WWAN link provided by the eNB; and
 p2 is an estimated retransmission rate for the WLAN link provided by the eNB;
   dynamically split the bearer traffic across the WWAN link and the WLAN link according to a set of priority rules for using the uplink grant and based at least in part on the WLAN transmission confirmation signal, the WLAN congestion status, and the WWAN congestion status;
   identify the one or more failed packets originally transmitted over the WLAN link; and
   move the one or more failed packets from the transmission queue to the retransmission queue in response to identifying the one or more failed packets; and
  a retransmission timer configured to indicate a maximum time that the link aggregation transmitter is configured to wait for the WLAN transmission confirmation signal, wherein the new packets are stored according to a sequential order of reception in the first packet buffer.

2. The apparatus of claim 1, wherein the bearer splitting component is further configured to:
 accept the new packets received in the first packet buffer for transmission;
 add the accepted new packets to the transmission queue in the sequential order;
 track un-transmitted packets and transmitted packets in the transmission queue, the un-transmitted packets waiting to be initially transmitted through the WWAN link or the WLAN link, and the transmitted packets waiting to be confirmed by the WLAN transmission confirmation signal, the retransmission timer set based on a first transmitted packet with priority in the transmission queue according to the sequential order; and
 in response to respective confirmations of successful transmission of the transmitted packets, remove successfully transmitted packets from the transmission queue, wherein after removal of the first transmitted packet the retransmission timer is reset based on a second transmitted packet remaining in the transmission queue with priority according to the sequential order.

3. The apparatus of claim 1, wherein the bearer splitting component is further configured to:
 identify the one or more failed packets based on an expiration of the retransmission timer or a failure indication from the WLAN transmission confirmation signal; and
 restart the retransmission timer based on a priority packet in the transmission queue according to the sequential order.

4. The apparatus of claim 1, wherein the bearer splitting component is further configured to:
 in response to an indication in the WWAN congestion status of below threshold congestion on the WWAN link when the one or more failed packets are in the retransmission queue, send the one or more failed packets to the WWAN link; and remove the one or more failed packets from the retransmission queue.

5. The apparatus of claim 1, wherein the bearer splitting component is further configured to:
if the WLAN congestion status indicates below threshold congestion on the WLAN link and one or more of the new packets in the transmission queue are awaiting transmission, send a first un-transmitted packet according to the sequential order in the transmission queue to the WLAN link; and
if the WLAN congestion status indicates above threshold congestion on the WLAN link and the WWAN congestion status indicates below threshold congestion on the WWAN link when the retransmission queue is empty, send the first new packet to the WWAN link and remove the first new packet from the transmission queue.

6. The apparatus of claim 1, wherein the cross-layer signal component is further configured to receive the WLAN congestion status from the WLAN stack lower layer protocol.

7. The apparatus of claim 1, wherein the link aggregation transmitter is further to determine the WLAN congestion status based on a number of packets sent to the WLAN link that are awaiting confirmation or a delay in sending packets to the WLAN link and receiving corresponding confirmations.

8. The apparatus of claim 1, wherein the cross-layer signal component is further configured to receive the WWAN congestion status from the WWAN stack lower layer protocol.

9. The apparatus of claim 1, wherein the link aggregation transmitter is configured to determine the WWAN congestion status based on hybrid automatic repeat request (HARQ) information.

10. The apparatus of claim 1, wherein the set of priority rules for the uplink grant comprises:
give first priority for transmission over the WWAN link to a first group of packets, if any, previously provided to the WWAN stack lower layer protocol;
give second priority for transmission over the WWAN link to a second group of packets, if any, in the retransmission queue;
give third priority for transmission over the WWAN link to a third group of packets, if any, to the un-transmitted packets in the transmission queue; and
give fourth priority for transmission over the WWAN link to a fourth group of packets, if any, to packets transmitted over the WLAN link and in the transmission queue awaiting confirmation.

11. The apparatus of claim 1, wherein the bearer splitting component is further configured to:
receive, from the WWAN stack lower layer protocol, an indication of available uplink resources in an uplink grant from the eNB;
in response to the WWAN congestion status indicating that there is below threshold congestion on the WWAN link and that the one or more failed packets are in the retransmission queue, send as many of the one or more failed packets as are allowed by the available uplink resources to the WWAN link; and
remove each of the one or more failed packets sent to the WWAN from the retransmission queue.

12. The apparatus of claim 11, wherein the bearer splitting component is further configured to:
if the WWAN congestion status indicates above threshold congestion on the WWAN link and the WLAN congestion status indicates below threshold congestion on the WLAN link when one or more of the new packets in the transmission queue are awaiting transmission, send a first new packet according to the sequential order in the transmission queue to the WLAN link; and
if the WWAN congestion status indicates below threshold congestion on the WWAN link when the retransmission queue is empty, send as many of the un-transmitted packets in the transmission queue as are allowed by the available uplink resources to the WWAN link, and remove each of the un-transmitted packets sent to the WWAN link from the transmission queue.

13. The apparatus of claim 12, wherein the bearer splitting component is further configured to:
determine an unused portion of the available uplink resources; and
send, to the WWAN link, a second BSR for transmission in the unused portion of the available uplink resources, the second BSR indicating that the UE has no additional traffic to send over the WWAN link.

14. The apparatus of claim 1, wherein the UE comprises at least one of a speaker, a microphone, a connection port, a keyboard, a touch screen, a battery, a memory port, and one or more antennas.

15. An apparatus for communication through a wireless wide area network (WWAN) link and a wireless local area network (WLAN) link, the apparatus comprising:
a user equipment (UE);
a first packet buffer to receive bearer traffic comprising uplink packets to transmit from the UE to an evolved universal terrestrial radio access network (E-UTRAN) Node B (eNB);
a link aggregation transmitter comprising:
a cross-layer signal component to:
receive, from a WLAN stack lower layer protocol, a WLAN transmission confirmation signal and a WLAN congestion status; and
receive, from a WWAN stack lower layer protocol, a WWAN transmission confirmation signal and a WWAN congestion status; and
a bearer splitting component to:
dynamically split the bearer traffic across the WWAN link and the WLAN link based at least in part on the WLAN transmission confirmation signal, the WLAN congestion status, and the WWAN congestion status; and
determine an estimated number of bytes z to send over the WWAN link according to:

$z = m1 \times p1 + m2 \times p2 + m3$, where:

m1 is the total number of bytes of the un-transmitted packets in a transmission queue of a second packet buffer;
m2 is the total number of bytes of the transmitted packets in the transmission queue awaiting confirmation;
m3 is total number of bytes of the packets in a retransmission queue of the second packet buffer;
p1 is an estimated traffic splitting ratio parameter for the WWAN link provided by the eNB; and
p2 is an estimated retransmission rate for the WLAN link provided by the eNB.

16. The apparatus of claim 15, wherein:
the UE is configured to send a buffer status report (BSR) message to the eNB and receive in response an uplink grant, the BSR message including the estimated number of bytes z; and the bearer splitting component is further configured to dynamically split the bearer traffic across the WWAN link and the WLAN link according to a set of priority rules for using the uplink grant.

17. The apparatus of claim 16, wherein the set of priority rules for using the uplink grant comprises:
give first priority for transmission over the WWAN link to a first group of packets, if any, previously provided to the WWAN stack lower layer protocol;
give second priority for transmission over the WWAN link to a second group of packets, if any, in the retransmission queue;
give third priority for transmission over the WWAN link to a third group of packets, if any, to the un-transmitted packets in the transmission queue; and
give fourth priority for transmission over the WWAN link to a fourth group of packets, if any, to packets transmitted over the WLAN link and in the transmission queue awaiting confirmation.

\* \* \* \* \*